US007040016B2

(12) United States Patent
Bergstrom et al.

(10) Patent No.: US 7,040,016 B2

(45) Date of Patent: May 9, 2006

(54) METHOD OF FABRICATING A MANDREL FOR ELECTROFORMATION OF AN ORIFICE PLATE

(75) Inventors: Deanna J. Bergstrom, Corvallis, OR (US); Rio Rivas, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 10/692,374

(22) Filed: Oct. 22, 2003

(65) Prior Publication Data

US 2005/0086805 A1 Apr. 28, 2005

(51) Int. Cl.

| | |
|---|---|
| ***B21D 53/76*** | (2006.01) |
| ***B23P 17/00*** | (2006.01) |
| ***B41J 2/14*** | (2006.01) |
| ***B41J 2/16*** | (2006.01) |

(52) U.S. Cl. ......................... 29/890.1; 29/830; 29/831; 29/832; 347/47

(58) Field of Classification Search ............... 29/890.1, 29/830, 831, 832; 347/47, 44, 63, 69; 427/534, 427/535, 264, 265, 266, 272; 216/67–71

See application file for complete search history.

(56) References Cited

U.S. PATENT DOCUMENTS 3,461,045 A 8/1969 Franks
4,246,076 A 1/1981 Gardner
4,430,784 A 2/1984 Brooks et al.
4,541,977 A 9/1985 Becker et al.
4,675,083 A 6/1987 Bearss et al.
4,694,308 A 9/1987 Chan et al.
4,773,971 A 9/1988 Lam et al.
4,791,436 A 12/1988 Chan et al.
4,847,630 A * 7/1989 Bhaskar et al. ............... 347/63
4,922,265 A 5/1990 Pan
5,167,776 A 12/1992 Bhaskar et al.
5,432,540 A * 7/1995 Hiraishi ....................... 347/69
5,443,713 A 8/1995 Hindman
5,462,648 A 10/1995 Wakabayashi et al.
5,501,784 A 3/1996 Lessmollmann et al.
5,560,837 A 10/1996 Trueba
5,589,083 A 12/1996 Ahn et al.
5,617,631 A 4/1997 Nguyen
5,677,717 A * 10/1997 Ohashi ........................ 347/69
5,680,163 A * 10/1997 Sugahara ..................... 347/71
5,847,725 A 12/1998 Cleland et al.
6,022,752 A 2/2000 Hirsh et al.
6,127,198 A 10/2000 Coleman et al.
6,143,190 A 11/2000 Yagi et al.
6,164,759 A 12/2000 Fujii et al.

(Continued)

FOREIGN PATENT DOCUMENTS

JP 2001315327 11/2001

*Primary Examiner*—A. Dexter Tugbang
*Assistant Examiner*—Tai Nguyen

(57) ABSTRACT

A method of fabricating a mandrel for electroformation of an orifice plate. An array of mask elements may be created adjacent a substrate. Surface regions of the substrate disposed generally between the mask elements may be removed, to create a base having a base surface and a plurality of pillars extending from the base surface according to the array of mask elements. Each pillar may have a perimeter defined by an orthogonal projection of one of the mask elements onto the substrate. An electrical-conduction enhancer may be deposited adjacent the base surface and terminating at least substantially at the perimeter, to create a conductive layer to support growth of the orifice plate.

21 Claims, 3 Drawing Sheets

U.S. PATENT DOCUMENTS

| | | | |
|---|---|---|---|
| 6,179,978 | B1 | 1/2001 | Hirsh et al. |
| 6,214,192 | B1 | 4/2001 | Hawkins et al. |
| 6,223,405 | B1 | 5/2001 | Oikawa et al. |
| 6,231,772 | B1 | 5/2001 | Silverbrook |
| 6,232,135 | B1 | 5/2001 | Ashe et al. |
| 6,235,177 | B1 | 5/2001 | Borland et al. |
| 6,328,405 | B1 | 12/2001 | Weber et al. |
| 2002/0144613 | A1 | 10/2002 | Gates et al. |

* cited by examiner

METHOD OF FABRICATING A MANDREL FOR ELECTROFORMATION OF AN ORIFICE PLATE

BACKGROUND

Inkjet printers may use a printhead to eject ink droplets positionally onto print media such as paper. The printhead may include a plate having an array of bores or orifices, known as an orifice plate. The orifices may function as nozzles at which ink droplets may be created as ink is expelled from the printhead through the orifices. An array of thin-film electronic devices, such as resistor heaters or piezo elements, also may be positioned adjacent the array of orifices in the printhead. Selective energization of such thin-film devices may enable selective ejection of ink droplets from corresponding orifices.

The arrangement of orifices within an orifice plate may play an important role in determining print quality. In particular, the density of orifices may define the density of droplets that may be delivered to the print media. For example, orifice plates may include a pair of side-by-side orifice columns, each having 300 orifices per column-inch, which is equivalent to a center-to-center nozzle spacing of about 84 micrometers. The columns may be offset lengthwise along the axis of the columns by one-half orifice spacing relative to one another within the orifice plate to enable printing 600 droplets (or dots) per inch (dpi).

To achieve even higher printing resolutions, orifice plates with a higher density of nozzles may be needed. For example, printheads with orifice plates having densities of 600 nozzles per column-inch in a pair of adjacent, offset columns may deliver a total of 1200 dpi, to offer twice the printing resolution of 600 dpi printheads. However, the orifice plates of such higher resolution printheads may be difficult to fabricate.

Orifice plates may be fabricated by electroformation on a mandrel. The mandrel offers a conductive surface onto which a layer of metal may be electrodeposited to create a body portion of an orifice plate. The conductive surface may be interrupted by nonconductive islands that do not promote electrodeposition. Accordingly, the layer of metal may grow around and/or over the nonconductive islands to define orifices at the positions of the islands.

Mandrels with nonconductive islands in the form of pillars may define orifices by electrodeposition around the pillars. Accordingly, the pillars may be shaped according to the desired structure of the orifices, for example, by using a complementary mold to create the pillars. Recesses complementary to each of the pillars may be formed in the mold. Next, the recesses may be filled with a flowable material, and the flowable material solidified. Then, the solidified material may be separated from the mold to expose the pillars. A conductive surface may be formed on the surface between the pillars, before or after separation of the pillars from the recesses, to complete the mandrel. However, the use of a mold to create mandrel pillars may be unsatisfactory for fabricating mandrels with the high densities of thin pillars often needed for higher resolution orifice plates. In particular, the thin pillars may break when they are separated from the mold. In addition, the recesses may not be filled consistently with the flowable material, so that many of the pillars may be defective in structure.

Mandrels with nonconductive islands also may define orifices by electrodeposition over the pillars. In this approach, the body portion of the orifice plate may thicken and grow laterally over the perimeter of the islands at approximately the same rate. Accordingly, an orifice may be formed in a central region over each island, with the island itself defining a counterbore of the orifice plate that adjoins the orifice. As the body portion of the orifice plate grows thicker, the orifice decreases in diameter. Accordingly, forming a high density of orifices with sufficient diameters may require closely spaced islands and electrodeposition of a very thin body portion. However, the resultant orifice plate may be too thin to be useful, and the shape of the orifices may be difficult to modify.

SUMMARY

A method of fabricating a mandrel for electroformation of an orifice plate is provided. An array of mask elements may be created adjacent a substrate. Surface regions of the substrate disposed generally between the mask elements may be removed, to create a base having a base surface and a plurality of pillars extending from the base surface according to the array of mask elements. Each pillar may have a perimeter defined by an orthogonal projection of one of the mask elements onto the substrate. An electrical-conduction enhancer may be deposited adjacent the base surface and terminating at least substantially at the perimeter, to create a conductive layer to support growth of the orifice plate.

DETAILED DESCRIPTION

A system is provided, including method and apparatus, for fabrication of a mandrel and electroformation of an orifice plate with the mandrel. The method may be relatively simple and may enable arrays of orifices to be created with enhanced resolution. Accordingly, an orifice plate electroformed with the mandrel may have an orifice density, a diameter of orifices, and/or a thickness not achievable with other mandrels and electroformation processes.

Figure 1:
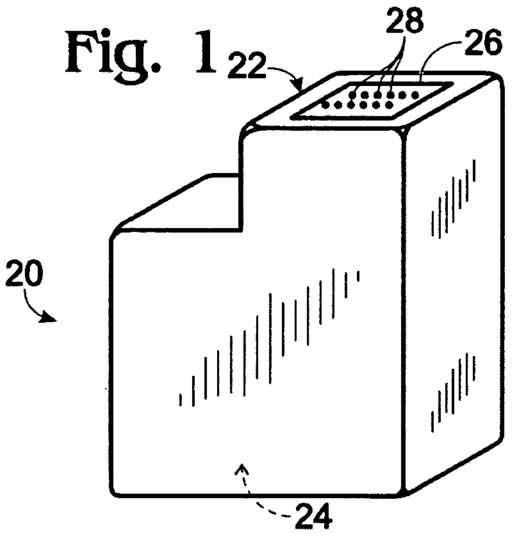
FIG. 1 is a perspective view an ink cartridge for an inkjet printer, with the ink cartridge having an orifice plate through which the ink droplets are ejected onto print media, in accordance with an embodiment of the invention.

FIG. 1 shows an embodiment of an ink cartridge 20 for an inkjet printer. The depicted orientation of the cartridge may be inverted from a typical orientation used during printing. Cartridge 20 may include a printhead 22 configured to eject ink droplets positionally onto print media, using ink received from ink reservoir 24. Printhead 22 may have an orifice plate 26 through which the ink exits the cartridge. Orifice plate 26 may define a plurality of orifices 28 or bores that act as individual nozzles for ink ejection from the printhead. The orifices are shown schematically in the FIG. 1. In alternative embodiments, the printhead may be spaced from the ink reservoir. Furthermore, the orifice plate described herein may be suitable for other fluid-ejection devices, such as a medicament ejector.

An orifice plate, as used herein, may be any plate-like member defining an array of orifices. The plate-like member may have a length and width that are substantially greater than the thickness of the plate-like member. The plate-like member may be substantially planar or may be nonplanar, for example, defining a convex surface from which fluid droplets are ejected.

The orifice plate may include any suitable material and may define any suitable arrangement of orifices. The orifice plate may be fabricated by electrodeposition, that is, a body portion of the orifice plate may be electroformed according to conductive regions of a mandrel. Accordingly, the orifice plate may be formed substantially of an electrically conductive material, such as a metal or a metal alloy, as described in more detail below. The orifices may be disposed in one or more linear columns, or may have a circular or irregular distribution. In some embodiments, the orifices may be disposed in an array having at least two side-by-side columns.

The orifice plate may include any suitable density, spacing, and diameter of orifices. When arranged in one or more columns, the orifices may have a density of at least about 500 nozzles (orifices) per column-inch. Although any number of orifices may be included per inch, in some embodiments, the orifice plate may have 500 to 5000 nozzles per column-inch. Adjacent orifices may be separated by an average spacing of about 50 micrometers or less (from center to center of adjacent orifices). In some embodiments, the average spacing may be between about 50 micrometers to 5 micrometers. Orifices may have a diameter of less than about 25 micrometers, or may have a diameter of between about 6 to 25 micrometers. As used herein, the diameter is a minimum diameter within the orifice. For use in medicament ejectors, at least some of the orifices may have diameters of about 1–5 micrometers. For ease of handling, the thickness of the orifice plate may be at least about 20 micrometers, or in some embodiments, between about 20–30 micrometers.

Exemplary embodiments of the orifice plate may have the following features. Orifices may be disposed in adjacent columns to define at least about 1000 or 1200 nozzles in at least two columns. Each column may include at least about 500 or 600 nozzles and may have a density of at least about 500 or 600 nozzles per column-inch and a combined density of at least about 1000 to 1200 nozzles per inch within a clustered nozzle array. The nozzles may have a spacing of about 42.3 micrometers or less, and a diameter of at least about 20 micrometers for black ink, and a diameter of about 8–15 micrometers for color ink.

The orifices may be shaped and positioned based on the structure of a mandrel, as described below. Accordingly, fabrication of a mandrel with desired features enables the structure of the orifice plate.

FIGS. 2–5 show embodiments of mandrel intermediates and a mandrel for electroformation of a body portion of orifice plate 26, to illustrate a process of fabricating the mandrel. A mandrel, as used herein, is any form or mold having a conductive surface upon which a body portion (or all) of the orifice plate may be electroformed by spatially selective electrodeposition. The mandrel may be separated from the body portion after the electrodeposition for reuse, or may be discarded after use, as exemplified below. FIGS. 2–5 and other figures presented are intended to be somewhat schematic, and thus may include features that are not drawn to scale.

Figure 2:
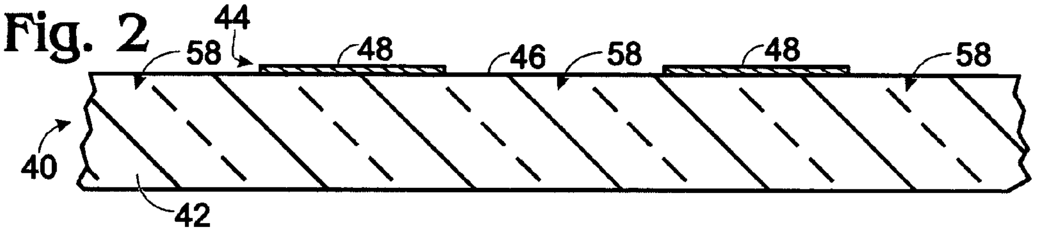
FIGS. 2–4 are fragmentary sectional views of mandrel intermediates created by a process of mandrel formation, with the mandrel being suitable for electroformation of a body portion of the orifice plate of FIG. 1, in accordance with embodiments of the invention.

FIG. 2 shows a masked substrate 40 that may be created as a mandrel intermediate. Masked substrate 40 may include a substrate 42 and a mask layer 44 disposed adjacent a surface 46 of the substrate. The substrate may be electrically nonconductive, that is, a semiconductor or an insulator. Accordingly, the substrate may be formed substantially of silicon, gallium arsenide, glass, and/or plastic, among others. However, in some embodiments, the substrate may be etchable anisotropically, and may include, for example, monocrystalline silicon. The substrate may be substantially planar and structured as a sheet or a wafer. Accordingly, surface 46 may be substantially planar. Alternatively, the substrate may have a nonplanar structure and/or a nonplanar surface.

Mask layer 44 may include a plurality of mask elements 48 arrayed on surface 46. Each mask element (or cap element) may overlie the substrate and may function to position a corresponding, underlying mandrel feature (a pillar), as described below. In addition, each mask element may function to define, at least in part, a size and a shape of the pillar. Accordingly, the mask elements may be disposed in an array that corresponds in number and position to a corresponding array of orifices to be created in an orifice plate. The mask layer may be chemically distinct from the substrate and resistant to an etchant, to enable mask elements 48 to selectively protect underlying surface regions of the substrate from the etchant.

The mask layer may be formed on the substrate by any suitable process. For example, the mask layer may be formed from a photoresist layer deposited adjacent the substrate surface. The photoresist layer may be patterned by photolithography using a photomask and light, and then selectively removed based on exposure to the light. The selectively removed regions of the photoresist layer may be complementary to the mask elements within the photoresist layer. Alternatively, or in addition, the mask layer may be a hard mask formed within or adjacent the substrate as a layer of silicon dioxide, silicon nitride, or silicon carbide, among others.

Figure 3:
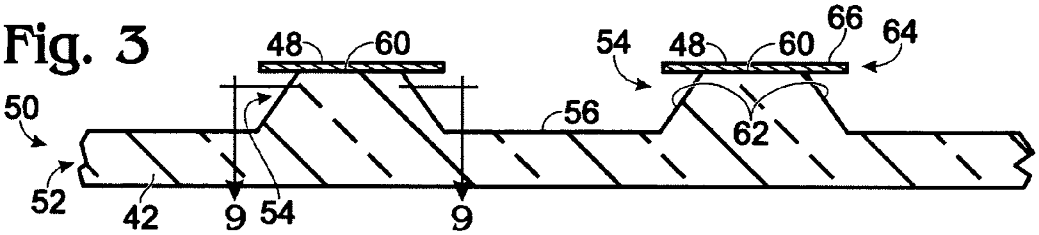

FIG. 3 shows an etched substrate 50 that may be formed as a mandrel intermediate. Etched substrate 50 may include a base 52 and a plurality of pillars 54 joined unitarily to the base. The pillars may be any projections that extend from base 52, in particular, from a base surface 56 defined by base 52. Base surface 56 may be formed by selectively removing surface regions 58 of substrate 42 (see FIG. 2). Surface regions may be removed by selectively etching exposed surfaces of surface regions 58. Masked surfaces 60 of the substrate, which underlie mask elements 48, may be selectively retained.

Pillars 54 may have side surfaces 62 and a top portion 64. Side surfaces 62 may extend between base surface 56 and top portion 64, to elevate top portion 64 above the base surface. The terms above or below, and underlying or overlying, are used herein to denote position relative to each other and distance from to a central plane of the substrate. Accordingly, a first structure below or underlying a second structure is disposed generally between the central plane and the second structure, which is above or overlying the first structure.

Top portion 64 may be a region of the pillar spaced farthest from base 52. The top portion may include protected substrate surface 60. The top portion also may include mask element 48, or the mask element may be considered as distinct from the pillar. The operation of selectively removing surface regions 58 of the substrate may form side surfaces 62 that extend obliquely from the base surface, by lateral substrate removal that undercuts the mask element. Accordingly, undercutting may create an overhang 66 from mask element 48. The overhang may be a region of the mask element extending over the side surfaces and/or base surface 56.

Figure 4:
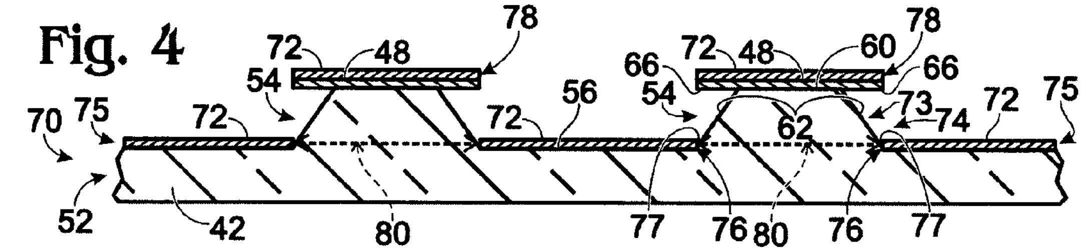

FIG. 4 shows a conductive mandrel precursor 70 that may be an intermediate in formation of a mandrel. Alternatively, mandrel precursor 70 may be used as a mandrel. Mandrel precursor 70 may be formed by selectively depositing an electrical-conduction enhancer 72 onto base surface 56 of base 52 relative to side surfaces 62. Such selective deposition may include depositing substantially none of enhancer 72 on an upper portion 73 of the side surfaces that is spaced from the base surfaces by a lower portion 74 of the side surfaces disposed beside the base surface. Selective deposition may place at least about ten-fold more enhancer 72 per unit area of base surface relative to per unit area of the side surfaces 62. Alternatively, or in addition, selective deposition of enhancer 72 may create a conductive layer that extends adjacent a major portion of the base surface disposed between the pillars and adjacent a minor portion, less than about 25%, or substantially none of the side surfaces.

The electrical-conduction enhancer may be any material that promotes formation of the electrically conductive layer 75 adjacent base surface 56. Accordingly, the enhancer may be an electrically conductive material, such as a metal or a metal alloy. For example, the enhancer may be aluminum or stainless steel, among others. An electrically conductive material may be deposited by any suitable operation, such as vapor deposition, sputtering, or the like. Alternatively, the enhancer may be a material that enters and dopes a surface region of the substrate, as described in more detail below (see FIG. 13).

Conductive layer 75 may be formed to be substantially discontinuous with side surfaces 62 of pillars 54. For example, conductive layer 75 may terminate at least substantially at a perimeter 76 of each pillar, defined by an orthogonal projection of each of the mask elements, that is, orthogonal to a plane defined by the mask elements, onto the base surface and/or side surfaces of the substrate. At least substantially terminating at the perimeter may place the conductive layer (and terminate deposition of the electrical-conduction enhancer) within about five micrometers or within about 2 micrometers of the perimeter. The perimeter and/or positions where conductive layer 75 terminates may be at least substantially at, or coinciding with, a base-pillar boundary 77 defined where base surface 56 adjoins side surfaces 62, or within about five micrometers or two micrometers of the base-pillar boundary. The proximity of perimeter 76 to base-pillar boundary 77 may be defined by the mechanism used to create the pillars.

Deposition of enhancer 72 may selectively place the enhancer adjacent base surface 56 relative to adjacent side surfaces 62 of the pillars. This selective placement may be achieved by arrival of the enhancer from a path extending at least substantially orthogonal to base surface 56. Such placement, termed line-of-sight deposition, may selectively place enhancer 72 on exposed or accessible surfaces. Accordingly, enhancer 72 also may be deposited onto mask elements 48, which may form conductive regions 78 of the pillars. Conductive regions 78 may be in electrically conductive isolation from one another and from conductive layer 75. Conductive isolation may be produced by overhang 66, which may occlude enhancer 72 from side surfaces during deposition, up to perimeter 76. As a result, conductive layer 72 may include a plurality of openings 80 that are similar in size (area and diameter) and position to mask elements 48, but which are offset orthogonally from the mask elements (to the base-pillar boundaries) by the height of the pillars.

Figure 5:
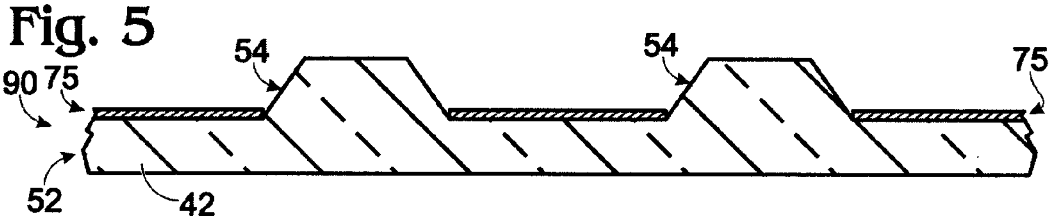
FIG. 5 is a fragmentary sectional view of a mandrel produced from the mandrel intermediates of FIGS. 2–4, in accordance with an embodiment of the invention.

FIG. 5 shows a mandrel 90 that may be produced from the mandrel intermediates of FIGS. 2–4. In particular, mandrel 90 may be formed from mandrel precursor 70 by selectively removing mask elements 48, while retaining conductive layer 75. Overlying conductive regions 78 that are connected to substrate 42 by mask elements 48 also may be removed during this operation. Any suitable chemical or physical agent may be used to remove mask elements 48. For example, a chemical etchant may be used that selectively removes a photoresist relative to conductive layer 75 (and relative to substrate 42).

Figure 6:
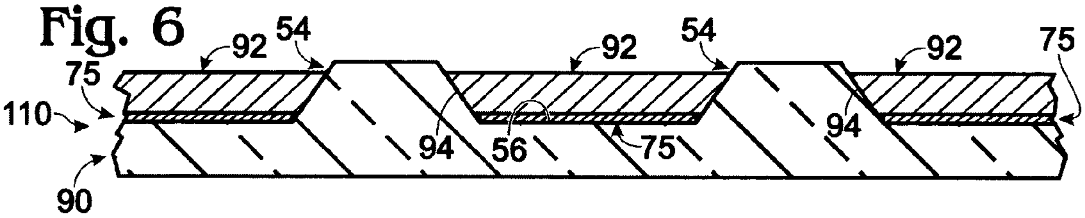
FIG. 6 is a fragmentary sectional view of an assembly of the mandrel of FIG. 5 supporting an electroformed body portion of the orifice plate of FIG. 1, in accordance with an embodiment of the invention.

FIG. 6 shows a mandrel assembly 110 in which mandrel 90 is supporting a body portion 92 of an orifice plate. Body portion 92 may be electroformed by electrodepositing an electrically conductive material adjacent conductive layer 75. Accordingly, body portion 92 may progressively grow in thickness in a direction generally orthogonal to base surface 56. Lateral growth of the body portion may be restricted by pillars 54, so that the pillars define the shape of bores 94. Any suitable electrically conductive material may be used to create the body portion, including a metal or metal alloy, such as nickel, copper, an iron/nickel alloy, etc.

Figure 7:
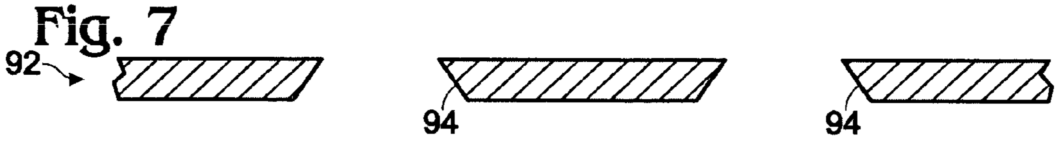
FIG. 7 is a fragmentary sectional view of the body portion of the orifice plate of FIG. 6 after separation from the mandrel, in accordance with an embodiment of the invention.

FIG. 7 shows body portion 92 separated from mandrel 90. The body portion may be removed from the mandrel by any suitable method, such as using a sharp tool to initiate separation at an edge of the body portion and then peeling the body portion from the mandrel. The body portion may correspond to a single orifice plate or to a plurality of orifice plates that are to be singulated.

Figure 8:
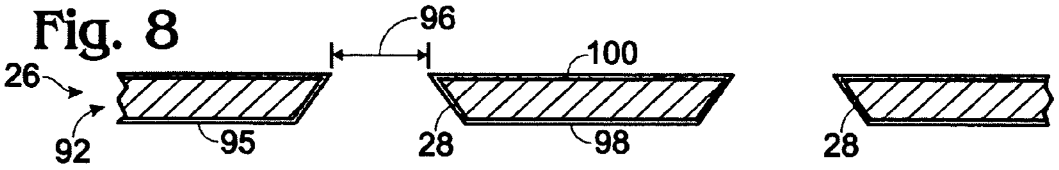
FIG. 8 is a fragmentary sectional view of the orifice plate of FIG. 1 produced by coating the body portion of FIG. 7, in accordance with an embodiment of the invention.

FIG. 8 shows orifice plate 26 produced by covering body portion 92 with a thin protective film 95. The protective film may be electrically conductive and may be formed of a corrosion-resistant metal or metal alloy, such as gold, palladium, and/or rhodium, among others. Alternatively, the protective film may be a sol-gel or other coating configured to protect the body portion from corrosion. The protective thin may be relatively thin, for example about 200 nanometers to about 2 micrometers, but may reduce the diameter of the orifices relative to bores 94 of the body portion. The diameter of an orifice, as used herein, may be a minimum diameter, shown at 96, that is, the smallest diameter measured orthogonal to central axis through the orifice. The minimum diameter may be defined by a distal portion of a tapering pillar. The orifice plate may include a supply side 98, from which fluid is received, and an ejection or exit side 100, from which fluid (such as ink) is ejected. Accordingly, orifices 28 may taper toward the exit side. In addition, the region of the body portion disposed closest to the exit side may be electrodeposited last during electroformation of the body portion.

Figure 9:
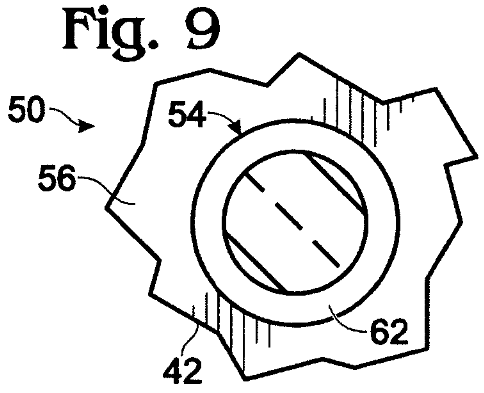
FIG. 9 is a plan sectional view of a pillar of the mandrel intermediate of FIG. 3, viewed generally along line 9—9 of FIG. 3, in accordance with an embodiment of the invention.
Figure 10:
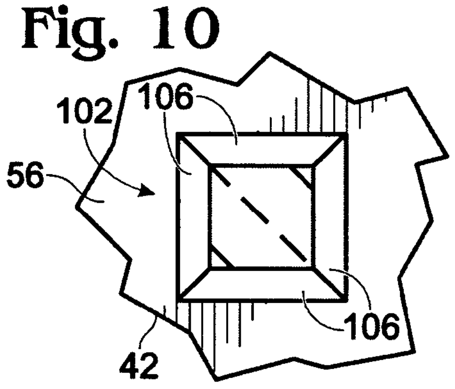
FIG. 10 is a plan sectional view of another mandrel pillar, viewed as in FIG. 9, in accordance with an embodiment of the invention.
Figure 11:
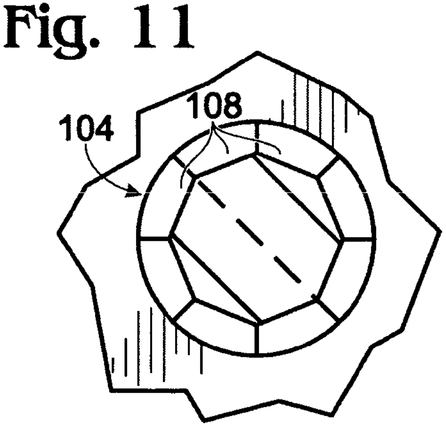
FIG. 11 is a plan sectional view of yet another mandrel pillar, viewed as in FIG. 9, in accordance with an embodiment of the invention.

FIGS. 9–12 show pillars of various structure that may be included in a mandrel. These pillars may be formed by selectively removing substrate regions 58 from the substrate (see FIG. 2), for example, by using different etching conditions. Each pillar may define a corresponding frustum-shaped or non-frustum-shaped orifice of an orifice plate. Furthermore, the frustum shape of the pillar and orifice may be conical or polyhedral, that is, with a circular or polygonal cross section, as shown in FIGS. 9–11 and described below. Non-frustum shaped pillars and orifices also may have circular or polygonal cross sections. Alternatively, any other suitable cross sectional shape may be used.

FIG. 9 shows a plan sectional view of pillar 54, viewed generally along line 9—9 of FIG. 3. Pillar 54 may be formed, for example, by dry etching the substrate with fluorine-containing gas, to create a frusto-conical pillar structure having a circular cross section. By adjusting the dry etching conditions, the side surfaces of the pillar may extend at any suitable angle from the base surface, for example, from about 45 degrees to about 90 degrees. Dry etching conditions may create a constant angle of inclination, to define a conical frustum, or may be adjusted during etching to create non-frusto-conical pillars having a varying angle of the side surfaces, for example, having an increasing slope towards the top portion or a decreasing slope toward the top portion.

FIGS. 10 and 11 show plan sectional views of alternative mandrel pillars, 102 and 104, respectively, viewed generally as pillar 54 of FIG. 9. Each of pillars 102 and 104 may be created as a polyhedral form by wet-etching crystalline silicon wafers with different crystal orientations, using, for example, tetramethyl ammonium hydroxide. Each of pillars 102, 104 may have a plurality (four or eight) of substantially planar side surfaces 106, 108, respectively. Planar side surfaces, as used herein, may extend over a portion or all of the length of each pillar.

The portion of each pillar over which each planar side surface extends may be determined by the shape of overlying mask elements. For example, pillar 104 may be defined by etching around and under a circular mask element. Accordingly, a bottom portion of the pillar (near the base surface) may be circular in cross section, which may transition to octagonal as the pillar extends away from the base surface. Alternatively, each mask element may be octagonal and oriented so that the pillar is substantially octagonal in cross section throughout its length. Similarly, pillar 102 may be defined by wet etching around and under an overlying square mask element, to define a square pillar partially or completely along the length of the pillar. Alternatively, pillar 102 may be defined by wet etching using, for example, a circular mask element to create a circular cross section near the bottom of the pillar, which may transition to a square cross section in a spaced relation from the bottom of the pillar and from the base surface.

Pillars may be structured along their lengths during two or more separate etching steps (multi-level etching) to provide other pillar shapes with varying profiles. For example, after a first etching step, some or all of the mask elements may be removed and then a second set of smaller mask elements formed on the tops of the pillars. Alternatively, the existing mask elements may be reduced in size to create the second set of mask elements. Each pillar may have one or more mask elements of the second set, and some of the pillars may lack mask elements of the second set. In some embodiments, each mask element of the second set may be centered on a pillar or may be disposed asymmetrically. Etching around and/or under the second set of mask elements may be used to build a two-level pillar structure, which may appear as a smaller pillar on a larger pillar. Additional masking and etching steps may be included to form other multi-level pillars with three or more levels. Additional manipulation of the substrate, including forming a conductive layer and using the resultant mandrel to form an orifice plate may be conducted as described above and below. Orifices of the orifice plate may have a chamber region formed by the lower portion of the pillar and a nozzle region formed by the upper portion of the pillar, similar to that shown in FIG. 16 below. By formation of multi-level pillars, the nozzle region may have a profile that is formed independently from the profile of a subjacent chamber. Similarly, a counterbore may be produced by electroformation around the last set of mask elements, as described below in relation to FIG. 14. Furthermore, the pillars of a mandrel may have different profiles produced by selective masking of a subset of the pillars in additional masking and etching steps.

Multi-level etching also may be used to define additional features in orifice plates. For example, ink manifolds and ink flow channels may be created. Alternatively, or in addition, thinner regions of the orifice plate may be created to provide stress-relief structures or to provide boundaries at which orifice plates may be separated after formation, for example, to reduce cutting time.

Figure 12:
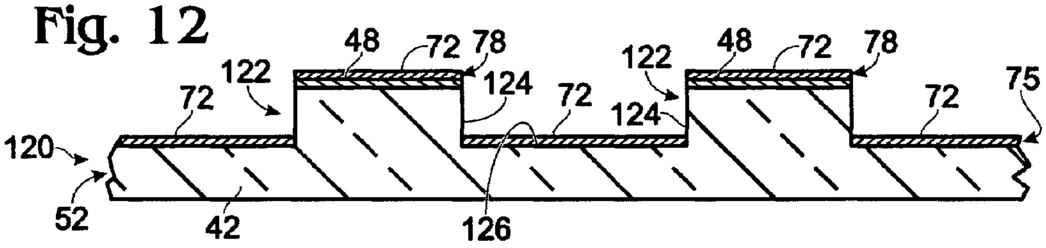
FIG. 12 is a fragmentary sectional view of a mandrel with pillars having vertically disposed side surfaces, in accordance with an embodiment of the invention.

FIG. 12 shows an embodiment of a mandrel 120 with pillars 122 having vertical side surfaces 124. Pillars 122 may be cylindrical or polyhedral, to define corresponding cylindrical or polyhedral orifices of an orifice plate or a body portion thereof. Selective removal of the substrate may produce no undercut, and thus no overhang from mask elements 48. However, line-of-sight deposition of electrical-conduction enhancer 72 may place the enhancer selectively adjacent base surface 126 relative to adjacent side surfaces 124. In particular such deposition may be selective for the base surface because side surfaces 124 are disposed substantially parallel to the path of enhancer deposition. Mandrel 120 may be used and reused for electroformation of orifice plate without removal of mask elements 48 and conductive regions 78. Alternatively, mask elements 48 and conductive regions 78 may be removed before use of the mandrel.

Figure 13:
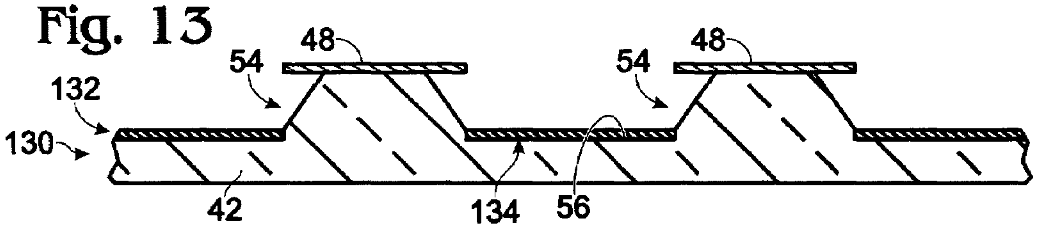
FIG. 13 is a fragmentary sectional view of a mandrel with a conductive layer formed by substrate doping, in accordance with an embodiment of the invention.

FIG. 13 shows an embodiment of a mandrel 130 having a conductive layer 132 formed by substrate doping, particularly n-type doping. Conductive layer 132 may be formed after selective removal of substrate regions to define pillars 54 (see FIG. 3). The conductive layer may be formed by implanting ions adjacent and below substrate surface 56, within a surface layer 134 of the substrate. The ions may be implanted, for example, by acceleration within an electric field. Exemplary ions that may be implanted may include arsenic, nitrogen, phosphorous, and/or bismuth, among others. After ion implantation, the substrate may be annealed (heated) to increase conductivity of the surface layer to form conductive layer 132. In some embodiments, annealing may incorporate at least a subset of the implanted ions into a crystal structure of the substrate.

Figure 14:
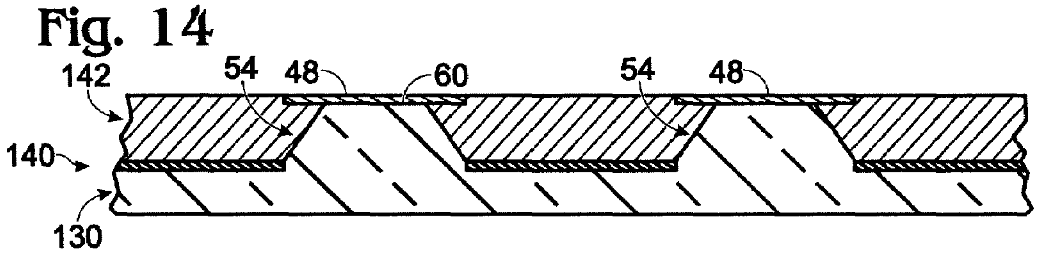
FIG. 14 is a fragmentary sectional view of an assembly of the mandrel of FIG. 13 supporting an electroformed body portion of an orifice plate, in accordance with an embodiment of the invention.

FIG. 14 shows an assembly 140 of mandrel 130 supporting a body portion 142 of an orifice plate. The body portion may be electroformed by electrodeposition of a suitable electrically conductive material onto the mandrel, as described above. In the present illustration, mask elements 48 have not been removed from pillars 54. Accordingly, the mask elements may provide an increased diameter adjacent a distal or top portion of the pillar. As a result, each mask element may define an enlarged portion of a corresponding orifice. However, mandrel 130 may not be reusable, because body portion 142 may not be separable from mandrel 130 without removing or destroying the mask elements.

Figure 15:
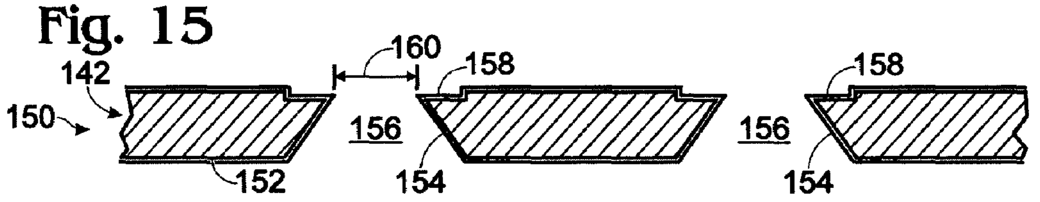
FIG. 15 is a fragmentary sectional view of an orifice plate produced by separating the body portion of FIG. 14 from the mandrel and coating the separated body portion, in accordance with an embodiment of the invention.

FIG. 15 shows an embodiment of an orifice plate 150 produced by separating body portion 142 of assembly 140 from mandrel 130. Body portion may be coated with a protective layer 152, as described above, to resist corrosion of the body portion. Orifice plate 150 may define a plurality of orifices or bores 154 having a frustum portion 156 adjoining a counterbore 158. The frustum portion may be structured according to any of the pillar frusta described above and may have a minimum diameter adjoining the counterbore, shown at 160. Counterbore 156 may have a diameter greater than the minimum diameter of the frustum portion. Such a widened distal region may reduce droplet misfiring and may improve droplet trajectories.

Figure 16:
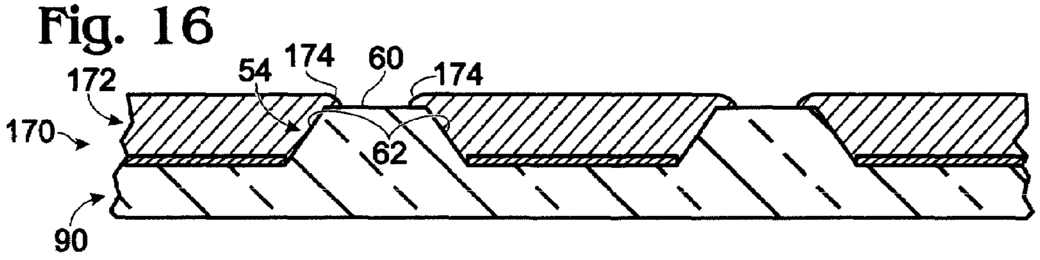
FIG. 16 is a fragmentary sectional view of the mandrel of FIG. 5 supporting an electroformed body portion of an orifice plate, in accordance with an embodiment of the invention.

FIG. 16 shows a mandrel assembly 170 of mandrel 90 (see FIG. 5) supporting an electroformed body portion 172 of an orifice plate. Body portion 172 may be electroformed by electrodeposition to a level above pillar 54. When growth of the body portion is no longer restricted by side surfaces 62, the body portion may grow laterally to create a lateral extension 174 above pillar 54. The lateral extension may define a nozzle region or compartment disposed above a storage region or compartment defined according to the shape of the pillar.

Figure 17:
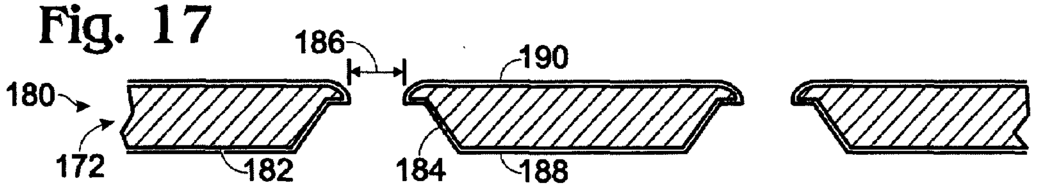
FIG. 17 is a fragmentary sectional view of an orifice plate produced by separating the body portion of FIG. 16 from the mandrel and coating the body portion, in accordance with an embodiment of the invention.

FIG. 17 shows an embodiment of an orifice plate 180 produced by separating body portion 172 from mandrel 90 and adding a protective layer 182. Orifice plate 180 may define a plurality of orifices 184. Each orifice may have a minimum diameter, shown at 186, created by lateral extension 174 (and, optionally, added protective layer 182). Accordingly, orifice plate 180 may be configured for receiving fluid adjacent supply side 188 and ejecting the fluid from ejection side 190. Alternatively, the orifice plate may be inverted, to receive fluid adjacent side 190 and to eject fluid from side 188.

It is believed that the disclosure set forth above encompasses multiple distinct embodiments of the invention. While each of these embodiments has been disclosed in specific form, the specific embodiments thereof as disclosed and illustrated herein are not to be considered in a limiting sense as numerous variations are possible. The subject matter of this disclosure thus includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

What is claimed is:

1. A method of fabricating a mandrel for electroformation of an orifice plate, comprising:

creating an array of mask elements adjacent a substrate;

removing surface regions of the substrate disposed generally between the mask elements to create a base having a base surface and a plurality of pillars extending from the base surface according to the array of mask elements, each pillar having a perimeter defined by an orthogonal projection of one of the mask elements onto the substrate; and depositing an electrical-conduction enhancer adjacent the base surface and terminating at least substantially at the perimeter, to create a conductive layer to support growth of the orifice plate.

2. The method of claim 1, wherein creating an array of mask elements includes forming a mask layer adjacent a surface of the substrate and selectively removing portions of the mask layer complementary to the mask elements.

3. The method of claim 1, wherein removing includes at least one of wet etching and dry etching the surface regions.

4. The method of claim 1, wherein removing produces a plurality of substantially frusto-conical pillars.

5. The method of claim 1, wherein removing produces a plurality of pillars have at least substantially planar side surfaces.

6. The method of claim 1, wherein depositing an electrical-conduction enhancer includes depositing a metal or a metal alloy onto the base surface.

7. The method of claim 1, wherein depositing an electrical-conduction enhancer includes implanting ions below the base surface and annealing the substrate to form the conductive layer at positions where the ions were implanted.

8. The method of claim 1, wherein depositing an electrical-conduction enhancer includes depositing the electrical-conduction enhancer onto substrate surfaces visible along a line of sight generally orthogonal to the base surface.

9. The method of claim 1, wherein the pillar includes side surfaces adjoining the base surface, and wherein removing surface regions includes undercutting the mask elements to create overhangs disposed above the side surfaces, and wherein depositing an electrical-conduction enhancer includes depositing the electrical-conduction enhancer preferentially on the overhangs relative to the side surfaces.

10. The method of claim 1, which further comprises removing the mask elements after depositing.

11. The method of claim 1, wherein depositing includes terminating placement of the electrical-conduction enhancer within about five micrometers of the perimeter.

12. A mandrel for electroformation of an orifice plate produced according to the method of claim 1.

13. A method of fabricating a mandrel for electroformation of an orifice plate, comprising:

creating an array of mask elements adjacent a substrate;

removing surface regions of the substrate disposed generally between the mask elements to create a base having a base surface and a plurality of pillars extending from the base surface according to the array of mask elements, each pillar having side surfaces adjoining the base surface; and selectively depositing an electrical-conduction enhancer onto the base surface relative to the side surfaces, to create a conductive layer adjacent the base surface to support growth of the orifice plate.

14. The method of claim 13, wherein depositing an electrical-conduction enhancer on the base surface creates a conductive layer extending adjacent a substantial portion of the base surface and extending adjacent a minor portion or no portion of the side surfaces.

15. The method of claim 13, wherein the side surfaces include a lower portion beside the base surface and an upper portion spaced from the base surface, and wherein depositing an electrical-conduction enhancer selectively adjacent the base surface includes depositing substantially no electrical-conduction enhancer adjacent the upper portion of the side surfaces.

16. The method of claim 13, wherein the side surfaces adjoin the base surface at a base-pillar boundary, and wherein selectively depositing an electrical-conduction enhancer onto the base surface includes creating a conductive layer that terminates, at least substantially at the base-pillar boundary.

17. The method of claim 16, wherein creating a conductive layer includes creating a conductive layer that terminates within about five micrometers of the bass-pillar boundary.

18. The method of claim 13, wherein depositing an electrical-conduction enhancer includes depositing a metal or a metal alloy onto the base surface.

19. The method of claim 13, wherein depositing an electrical-conduction enhancer includes implanting ions below the base surface and annealing the substrate to form the conductive layer at positions where the ions were implanted.

20. The method of claim 13, wherein depositing an electrical-conduction enhancer includes depositing the electrical-conduction enhancer onto substrate surfaces visible along a line of sight generally orthogonal to the base surface.

21. A mandrel for electroformation of an orifice plate produced according to the method of claim 13.

* * * * *

UNITED STATES PATENT AND TRADEMARK OFFICE

CERTIFICATE OF CORRECTION

PATENT NO. : 7,040,016 B2 | Page 1 of 1
APPLICATION NO. : 10/692374
DATED : May 9, 2006
INVENTOR(S) : Deanna J. Bergstrom et al.

It is certified that error appears in the above-identified patent and that said Letters Patent is hereby corrected as shown below:

In column 12, line 7, in Claim 17, delete “bass-pillar” and insert -- base-pillar --, therefor.

Signed and Sealed this

Twenty-first Day of April, 2009

JOHN DOLL
*Acting Director of the United States Patent and Trademark Office*